July 3, 1956 — C. D. VANDENBURGH — 2,752,847
LIQUID-SOLID SEPARATING APPARATUS
Filed March 11, 1953 — 4 Sheets-Sheet 1

United States Patent Office 2,752,847
Patented July 3, 1956

2,752,847
LIQUID-SOLID SEPARATING APPARATUS

Charles D. Vandenburgh, Charleston, Md., assignor to American Viscose Corporation, Philadelphia, Pa., a corporation of Delaware Application March 11, 1953, Serial No. 341,740

9 Claims. (Cl. 100—116)

The present invention relates to apparatus for separating solid material from a liquid suspension thereof and particularly to apparatus adapted for producing successive masses of solid material of uniform size, shape, and consistency. The invention has particular utility with respect to a continuous automatic process for manufacturing viscose solution from cellulose pulp and is used to effect the step thereof wherein excess caustic solution is separated from the alkali cellulose resulting from the steeping of cellulose pulp within the caustic solution. Although the apparatus is applicable generally for separation of solids from liquid suspensions thereof, it is described, by way of example, with reference to the making of viscose material.

It is an object of the present invention to provide an automatic apparatus for receiving successive batches of a mixture of liquid and solid material, successively pressing the liquid from each bath to form a cake of the solid material, such a cake being constituted essentially of the solid material, then delivering each cake in formed condition to a position wherein it is free from constraint by the apparatus and disposed for removal therefrom. It is a specific object ancillary to the foregoing object to provide apparatus adapted for producing cakes of alkali cellulose from a suspension of cellulose fiber in aqueous caustic solution in conjunction with equipment for feeding a batch of the suspension to such apparatus, and other equipment for receiving successively formed cakes of alkali cellulose. It is a further object to provide apparatus in accordance with the above recited objects which may be loaded and unloaded, and is capable of flexible cyclic operation over a large range of cycle frequency. Still another object is to provide a press cylinder for such apparatus having quickly replaceable filter media adapted to be secured within end surfaces of the cylinder, namely, the surfaces of the piston and the head portion that face interiorly of the cylinder, without causing an irregular or uneven contour of such surfaces which might interfere with the separation of the cakes therefrom. Other objects, features, and advantages will become apparent from the following description of the invention and the drawing relating thereto in which Fig. 1 is a fragmentary elevation illustrating the liquid-solid separating apparatus of the invention in conjunction with feeding apparatus and a cake-receiving conveyor;

The invention is, in brief, an apparatus for separating a liquid from a solid material suspended therein and comprises a piston-type press and ancillary equipment for alternately charging liquid and transferring cakes of the solid material from the cylinder of the press body. An assembly is supported for movement in a direction extending transversely with respect to the longitudinal direction of the cylinder through a region adjacent the head-end of the cylinder which comprises a support, a retractable cylinder head, and a power-thrust unit mounted on the support for moving the cylinder head toward and away from its position for closing the cylinder. This assembly is supported on a slide and is reciprocated by a pair of power units fixedly supported with respect to the cylinder for moving the support into interlocking relationship with the cylinder. A pusher, supported by and adapted for movement across the open end of the cylinder, is provided for moving the cakes, when exposed, beyond the end of the cylinder to an offset position. A fluid-conductor is mounted on the support in spaced relationship with the path of the head within the assembly with the longitudinal direction of the fluid conductor extending lengthwise of such path of the head. The various power units are connected to a common control system for the actuation thereof in accordance with a predetermined cycle. The apparatus, a feeding duct, and a receiver for cakes of solid material produced by the apparatus are arranged so that the fluid-conductor is aligned under the feeding means in a position of the assembly which places the fluid-discharging end of the conductor over the cylinder.

Figure 1:
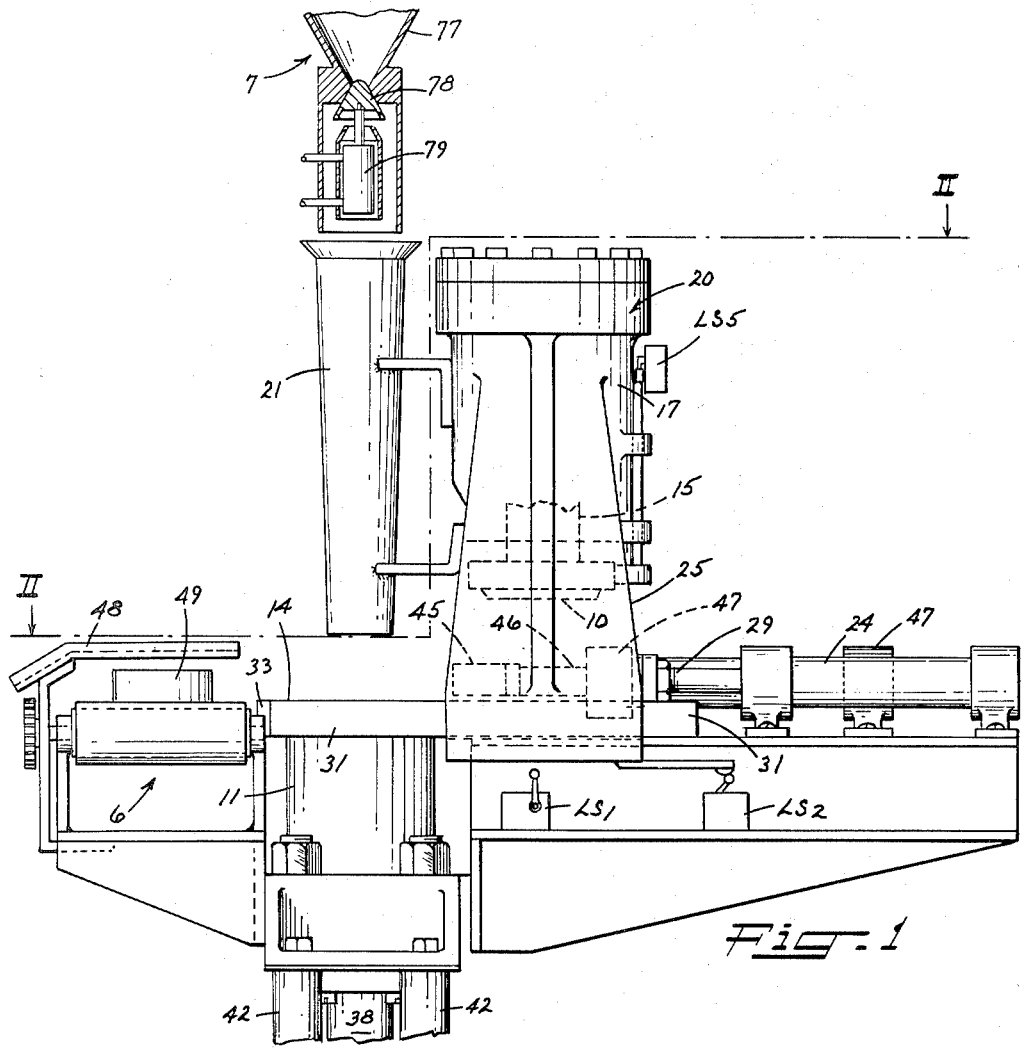
Figure 2:
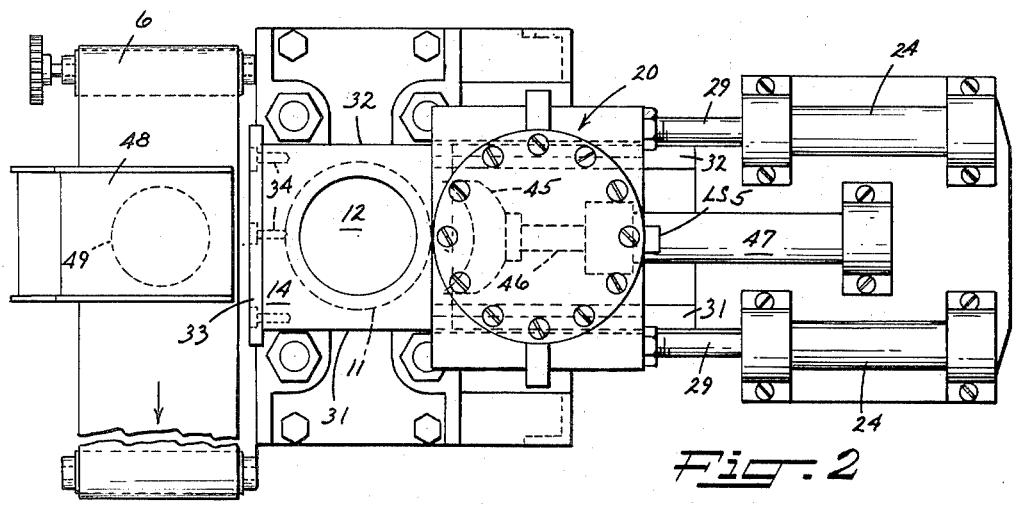
Fig. 2 is a shortened plan view of the apparatus as viewed from line II—II of Fig. 1.

Figs. 1 and 2 illustrate a liquid-solid pressing apparatus 5 in juxtaposition with a belt-type conveyor 6 and an apparatus 7 for feeding a liquid suspension of a solid to the extraction apparatus 5. The internal structure of the press 5 is shown in greater detail in Fig. 3. The apparatus 5 is essentially a piston-type press having a head 10 that is retractable with respect to the upper end of an extracting or process cylinder 11. The head 10 seats along an upper annular surface of the cylinder 11 extending radially from its chamber 12 and constitutes a portion of the upwardly-facing end surface 14 of the cylinder. The head 10 is supported on a piston rod or ram 15 which extends into the chamber 16 of the cylinder 17 and is secured to the piston 18 thereof. The cylinder 17 constitutes a portion of the member 20 which supports the head 10 and a chute or funnel 21 having its passageway extending substantially parallel to the path of movement of the head 10 and the other reciprocable parts mounted therewith.

The axes of the funnel 21 and the cylinder 16 are generally parallel and spaced from each other in a direction parallel to that of the movement of the support 20 relative to the cylinder 11. Such movement is produced in a direction that is approximately normal to the longitudinal direction of the cylinder 11 by a pair of fluid cylinders 24, as shown in Fig. 2 acting in parallel directions on the legs 25 and 26 of the support. The legs have straight parallel grooves 27 and 28 disposed into interlocking or approximately complementary relationship with parallel tracks 31 and 32, respectively, constituting rectilinear flanges or tongues of the upper portion of the cylinder 11. This arrangement enables the support 20 to be held in fixed position when a hydraulic force is exerted within the cylinder 17 to hold the head 10 against its seat along the upper portion of the cylinder 11. The tracks 31 and 32 may be extended, as shown in Fig. 1, to guide and support the assembly, comprising the support 20 and the head 10, along its entire reciprocal ambit. The grooves 27 and 28 have sufficient clearance with the surfaces of the flange portions to enable the support to be easily moved back and forth by the cylinders 24 to align either the head 10 or the funnel 21 in registry with the chamber 12. The support is stopped precisely at the first-named position by a cleat 33 secured, as by screws 34 shown, to a lateral surface of the top portion of the cylinder 11 so as to extend across and project beyond the ends of the tracks 31 and 32. The separate movements of the head 10 and the support 20 are controlled by limit switches and other means hereinafter described in greater detail.

The piston 35 of the process cylinder 11 is connected to a piston 36 located within a fluid cylinder 37, by a connecting rod 38 and a ram 39 connected end to end. Fluid is introduced into the cylinder 37 through a fixture 41 to reciprocate the assembly comprising the pistons 35 and 36. The cylinders 11 and 37 are spaced and held in fixed relative positions by four stay-bolts 42 having finished sections 42a which function as guides for a guide portion 43 of the ram 39. The fixture 41 also serves as a discharge port for liquid forced into the opposite end of the cylinder through a fitting 44.

As shown more plainly in Fig. 2, a cake-pushing member 45 is normally supported clear of the region traversed by the head 10 by the piston rod or ram 46 extending from a fluid cylinder 47. The pushing member may be preferably crescent shape, as shown, to engage an appreciable portion of the periphery of a cake lifted, by the piston 35, above the surface 14 of the cylinder 11 at one stage in the operating cycle of the extracting apparatus. Since the limits of movement of the member 45 are defined approximately by its position shown in Fig. 2 and a position over the conveyor for placing a cake 49 thereon, the cylinder 47 may be disposed laterally closer to the top of the cylinder 11 than are the cylinders 24 for moving the head support 20.

The conveyor 6 is positioned preferably sufficiently closely to the surface 14, that is, within ½ inch or so, so that the cakes discharged from the pressing cylinder 11 may be deposited thereupon by the pushing member without intervening support. The upper pass of the conveyor 6 receives the cakes and its upper surface is preferably disposed at a level no higher than, and preferably slightly lower than, the surface 14. As the slurry conductor 21 is positioned over, or carried over, the conveyor during movement of the support into its position directly over the process cylinder, a shallow drain pan 48 is supported immediately above the conveyor to catch the drip from the chute 21.

Figures 3, 4:
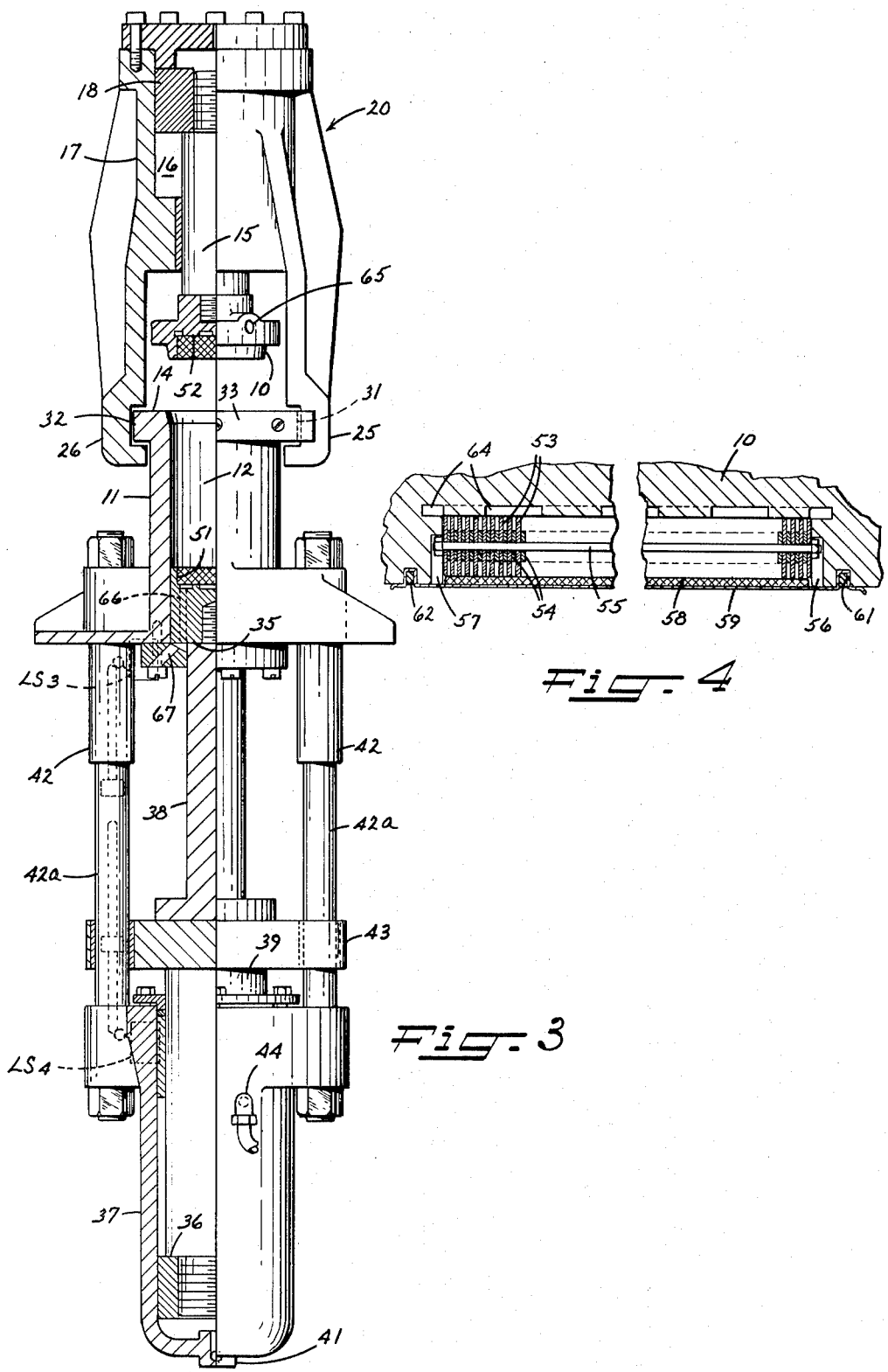
Fig. 3 is a partially sectioned elevation of the liquid-solid separating apparatus shown in Fig. 1 as viewed from the left.
Fig. 4 is a diametral section of a filter assembly used in the apparatus.

The cylinder head 10 and the piston 35 have circular recesses 51 and 52, respectively, which are preferably of the same size and shape, for receiving preferably similar filter media. As shown in Fig. 4, the recess of the cylinder head 10 is filled with a filter-medium comprising a large plurality of thin metallic plates 53 spaced by small washers 54 and held together by small bolts 55 extending through the plates and the washers. As an example of a satisfactory construction, plates 0.025 inch thick spaced by washers having a thickness of 0.010 inch have been used. In a process cylinder having an inner diameter of about eight inches, the recess provided for the filter was approximately seven inches in diameter and 1½ inches in depth. The walls of such a recess are slotted as shown in Fig. 4 at 56 and 57 to accommodate the heads and nuts of the bolts 55. Three of such bolts extend in parallel spaced relationship through the plates and washers. One set of edges of the plates 55 lie in a plane approximately flush with the surface of the head 10 or the piston 35, as the case may be. Such edges are overlain by a mat 58 of inert textile fibers such as those formed from co-polymers of vinyl chloride and vinyl acetate known as "Vinyon" and polymers of acrylonitrile, such as "Orlon," "Acrilan," and Dynel."

To hold the mat 58 in place over the area presented by the edges of the plates 53, a piece 59 of fabric woven of nylon or other high strength chemically resistant yarn is secured over the mat with an annular portion thereof forced into a circular groove 61 by a snap-ring 62. If desired, the fabric may be secured by pressing a chemically inert plastic material into the groove over the fabric until the groove is filled, and then allow the plastic to harden. The plates 53, washers 54, bolts 55, and ring 61 may be fabricated from a stainless steel having high resistance to alkali. Smaller recesses 64 extend beyond the principal plane defining the bottom of the recesses 52 to provide ducts for receiving the liquid forced between the plates 53. In the head 10, the recesses 64 are contiguous with ducts 65 extending laterally of the head shown in Fig. 3. In the piston 35, the recesses 64 are contiguous with a plurality of passageways 66 which discharge liquid to the lower portions of the cylinder 12 and outwardly thereof through drain passageways 67. The ducts 65 of the head 10 are connected with flexible tubes, not shown, leading to suction means.

The operation of the press is preferably described with reference to Fig. 5, which illustrates diagrammatically the hydraulic system for driving the various fluid-driven cylinders of the apparatus, and Fig. 6 which is an electrical diagram illustrating one arrangement of an electrical control system for the hydraulic system illustrated in Fig. 5. The diagram of Fig. 6 is limited to an automatic system, and separate electrical systems may be readily provided by a skilled electrician for obtaining a selective actuation of one or more parts of the hydraulic system independently of other parts. To facilitate the identification of the various valves and switches, a number system is adapted in which "T" followed by a number indicates a timer-type switch, "PS" and a number indicate a particular pressure switch, "R" and a number indicate a particular relay, "S" and a number indicate the solenoid of a solenoid-operated valve, and "V" and a number indicate a particular valve.

In Fig. 6, the numerals enclosed by circles indicate the actuating coils of such switches or solenoids. Their circuit-controlling terminals occur in other portions of the diagram by respective crossed or uncrossed pairs of short parallel lines. The various pairs of uncrossed parallel lines indicate switch terminals of various relay, timer, or pressure switches that are normally open, and the switch to which they belong is identified by the nearest numeral. The pairs of parallel lines crossed by a diagonal line indicate switch terminals that are normally closed. It will be noted that some switches have more than one pair of switch terminals in different portions of the diagram. For example, relay switch R6 has three pairs of terminals normally open; relay switch R2 has one pair of terminals normally open and one pair normally closed.

Since the apparatus herein described is adapted for use in a continuous process for manufacturing viscose solution, this operation is determined by the overall cycle of the main process and in accordance with the operation of such a system. The operation of the pulp pressing apparatus herein described is initiated at a proper instant within the overall cycle which may be controlled by a conventional multiple cam controller, of which one cam initiates the cycle of the pressing apparatus as shown in Fig. 6 wherein a cam 70 closes a spring-loaded normally open switch 71.

Figure 5:
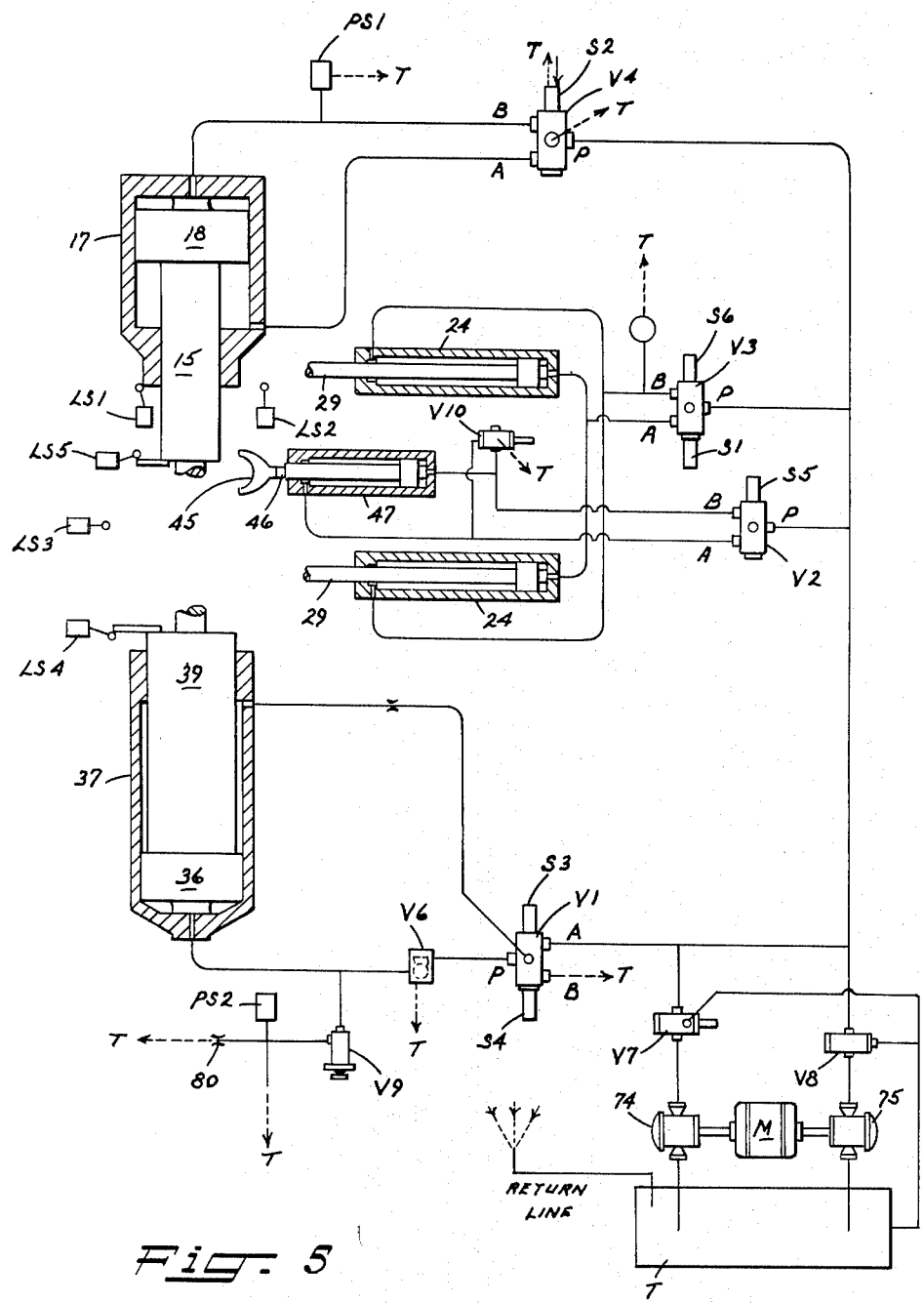
Fig. 5 is a diagram of the hydraulic system for operating the aparatus of Figs. 1 to 3.
Figure 6:
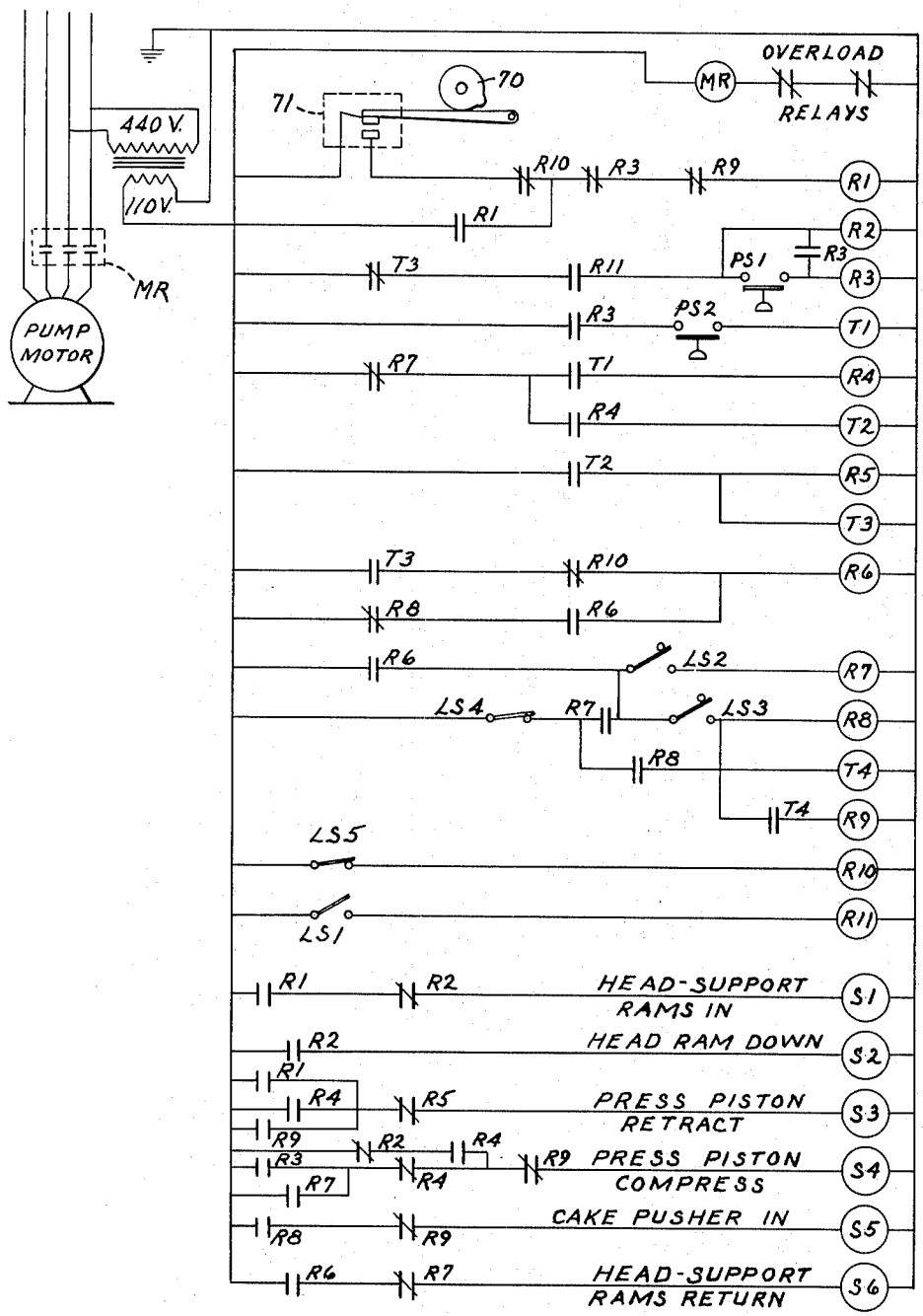
Fig. 6 is an electrical circuit diagram according to which the various electrical portions of the apparatus may be operated.

As shown in Fig. 5, oil is supplied to the various fluid-driven cylinders by two pumps 74 and 75 driven by the motor M. The pump 74 delivers a large volume of oil at a low pressure while the pump 75 delivers a still larger volume of oil at a higher pressure. With the pumps running and all of the solenoids de-energized, the oil from both pumps is bypassed through the ports A to B of a solenoid valve V1 and back to an accumulator tank T. To simplify the diagram of Fig. 5, the lines for returning exhaust oil to the tank from the various solenoid, safety, and pressure valves are not shown but are indicated by a short dotted line leading from the appropriate exhaust port and identified by the letter T. It will be noted that the valves V1, V3 are of the spring-centered type requiring two solenoids for operation while valves V2 and V4 have only one solenoid and are spring loaded to return them to one of two settings when respective solenoids are not energized.

Assuming that the pulp pressing cycle must be completed, preferably with time to spare, within each five minute revolution of the cam 70, the cycle of the press is commenced as the node of the cam closes the switch 71. At the instant before operation of the switch 71 the press is in a state of rest with the head-support 20 retracted to a position fully offset to the right with respect to the press cylinder as shown in Fig. 1 and the funnel 21 superimposed over the chamber 12 of the process cylinder 11. The cake pusher 45 is fully retracted to the right as shown in Fig. 3, the cylinder head 10 is retracted to its uppermost position within the support 20, and the press piston 35 is retracted to its lowermost position. The press cylinder chamber 12 has, in the normal operation of the viscose-making plant as a whole, received a charge of alkali-cellulose slurry from an overhead storage container 77 by operation of vertically movable conical valve element 78 and a fluid cylinder 79 operatively connected therewith.

The closing of the switch 71 energizes a normally open relay switch R1 which results in the closing of the bypass circuit for energizing the switch R1. At this stage of the cycle, the normally closed limit switch LS5 is open and thus the normally closed relay switch R10 is closed. Energizing of R1 closes the circuits through solenoids S1 and S3 which control, respectively, the movement of the head-support rams 29 to a position placing the head 10 directly over the process chamber 12, and the movement and hydraulic pressure for forcing the press piston downward to assure that this piston is in its downward position at this stage of the cycle.

As the head-support 20 slides into place, it engages the limit switch LS1 which closes the circuit through the relay switch R11 which in turn closes the circuit through the relay switch R2. As the switch R2 is energized, the solenoid S1 is de-energized by a normally closed portion of switch R2; another portion of this switch simultaneously closes the circuit for solenoid S2 of the valve V4 to lower the head 10 into seating relationship over the processing chamber 12. After the head 10 seats, the pressure in the cylinder 17 and the feed line therefor increases to a point at which the pressure switch PS1 is actuated, which in turn operates the relay switch R3 which closes the circuit through the solenoid S4 of the valve V1. Therefore, the press piston is caused to move toward the seated head 10. The liquid within the charge of slurry is then forced through the filtering media supported in the head 10 and the head portion of the press piston 35. The coil of the switch R1 is de-energized by operation of the switch R3.

As pressure builds up in the cylinder 37 for driving the press piston, a pressure switch PS2 starts a timer switch T1 to run its period of 3 minutes. The solenoids S2 and S4 remain energized during the timing period of T1 for which the valve V1 is set for the supplying of oil to the head end of the cylinder 37. At the completion of this period, the terminals held open by T1 close and the relay switch R4 is energized which in turn sets the timer switch T2 (timing period 15 seconds). The solenoid S4 is de-energized; the solenoid S3 is energized to produce a retraction of the press piston of about two inches whereby the pressure in the processing cylinder is relieved. As the pressure drops, the timer switch T1 de-energizes and resets. The timer switch T2 thereupon runs the period for which it is set and at the end of this period energizes the relay switch R5, and the timing switch T3. The normally closed switch R5 de-energizes solenoid S3 which when energized, causes retraction of the press piston.

As the switch T3 reaches the end of its 15 second period, the coils of the relay switches R2 and R3 are de-energized. The solenoid S2 thus is de-energized to permit the spring-returned valve V4 to return the cylinder head 10 to its uppermost retracted position. As the head reaches this position, the normally closed limit switch LS5 is opened, the relay switch R10 is in turn de-energized, and the circuit through the relay switch R6 is thus closed. Energizing the switch R6 closes the circuit through the solenoid S6 of the valve V3 whereupon the head support 20 is returned to an offset position with respect to the processing chamber 12 and the feeding funnel 21 attached to the support is superimposed directly over the chamber 12.

As the support reaches this position, the lever of the normally opened limit switch LS2 is engaged. The relay switch R7 is thereby engaged whereupon the solenoid S4 of the valve V1 is energized. The press piston 35 again moves upwardly until its head surface is even with the top surface 14 of the processing cylinder. Relay switches R4 and R5 are opened by the energizing of the switch R7; the timers T2 and T3 are thereby reset. Energizing of the switch R7 also causes opening of the circuit through the solenoid S6 which maintains the head support in its offset position. The press piston has, of course, in the meantime moved up to expose the cake above the processing cylinder. At the upward extremity of the stroke just completed by the press cylinder, the limit switch LS3 is engaged by a dog attached to the press piston ram. The switch LS3 energizes the relay switch R8 and the timing switch T4. The switch T4 is arranged so that the period, e. g., 15 seconds, for which it runs delays its function within the circuits of S3, S4, and S5 during the timing period.

The energizing of R8 opens the circuit through the coil of R6 and thus S6 is de-energized. However, the energizing of R8 closes the circuit through the solenoid S5 of the valve V2 because the closed terminals of R9 will not open until the switch T4 times out. Operation of this solenoid results in a flow of oil to the cake pusher which drives the rams of the cylinder 47 to the end of its cake-pushing stroke. As the switch T4 reaches the end of its timing period, the relay switch R9 having normally closed switch portions on the circuits of solenoids S4 and S5 and a normally open switch portion in the circuit of S3 is energized. Consequently, solenoids S4 and S5 are de-energized to permit the cake-pushing ram and the press piston ram to return. The normally closed limit switch LS4 is opened at the point of complete return of the press piston ram, thereby opening relays 8 and 9 of the same circuit. The timer T4 is thereupon de-energized and resets, and the solenoid S3 is de-energized. Thus the cycle is completed and may be initiated again by closing the switch 71.

The foregoing description of the electrical and hydraulic systems includes only features essential to the automatic operation of the press in accordance with the cycle desired. However, additional devices may be incorporated therein to add further refinements to the functioning of the apparatus. For example, a flow controlling device or valve V6 may be placed in the line between the valve V1 and the lower head-end of the cylinder 37 to provide different rates of fluid delivery during pressing strokes, the short cake-elevating stroke, and the return stroke. Relief valves V7 and V8 are included in the hydraulic system wherein the output of either pump 74 or 75 may be returned to the tank while passing the output of the other pump into the various fluid cylinder supply lines. A relief valve V9 is connected to the supply line to the head of cylinder 37 to return oil to the tank during the final pressing of the cake. A similar relief valve is provided on the supply line to the head-end of the cake-pusher cylinder. A fine orifice 80 of, e. g., $\frac{1}{16}$ inch in diameter is provided to maintain an unclogged line for the switch PS2 and the valve V9.

While a preferred embodiment of the invention has been shown and described, it is to be understood that changes and variations may be made without departing from the spirit and scope of the invention as defined in the appended claims.

I claim:

1. Apparatus for separating liquid from a mixture of a liquid and a solid material comprising a cylinder having a wall, a piston movable lengthwise of a passageway defined by said wall, a retractable head, said passageway terminating in an open end defined by an end surface of said wall to receive the head in sealed seating relationship, means including a support supporting the head, means carried by the support for reciprocating the head along a path extending toward and away from a plane coinciding generally with said end surface, and means connected to the support for moving an assembly comprising the support and the head along a fixed path extending in a transverse direction with respect to the longitudinal axis of the cylinder, said last-mentioned means being adapted to move said assembly into and out of a position which aligns the head for movement along said first-mentioned path into seating relation with said end surface.

2. Apparatus for separating liquid from a mixture of a liquid and a solid material comprising a cylinder having a wall, a piston movable lengthwise of a passageway defined by said wall, a retractable head, said passageway terminating in an open end defined by an end surface of said wall to receive the head in sealed seating relationship, means including a support mounted independently of the cylinder for supporting the head, means carried by the support for reciprocating the head along a path extending toward and away from a plane coinciding generally with said end surface, and means connected to the support for moving an assembly comprising the support and the head along a fixed path extending in a transverse direction with respect to the longitudinal axis of the cylinder, said last-mentioned means being adapted to move said assembly into and out of a position which aligns the head for movement along said first-mentioned path into seating relation with said end surface, said cylinder and the support having interlocking guide surfaces of which the longitudinal direction extends parallel to said path of the assembly, said guide surfaces being arranged and disposed to positively limit the movement of the assembly as a whole to said fixed path.

3. Apparatus for separating liquid from a mixture of a liquid and a solid material comprising a cylinder having a wall member, a piston member movable lengthwise of a passageway defined by said wall member, a retractable head member, at least one of said members comprising filtering media, said passageway terminating in an open end defined by an end surface of said wall adapted to receive the head member in sealed relationship, means including a support mounted independently of the cylinder for supporting the head member, means carried by the support for reciprocating the head member along a path extending toward and away from a plane coinciding generally with said end surface, and means connected to the support for moving an assembly comprising the support and the head member along a fixed path extending in a transverse direction with respect to th longitudinal axis of the cylinder, said last-mentioned means being adapted to move said assembly into and out of a position which aligns the head member for movement along said first-mentioned path into seating relation with said end surfaces, said cylinder and the support having interlocking guide surfaces of which the longitudinal direction extends parallel to said fixed path of the assembly, said guide surfaces being arranged and disposed to limit the movement of the assembly as a whole to said fixed path therefor.

4. Apparatus for separating liquid from a mixture of a liquid and a solid material comprising a cylinder having a wall, a piston movable lengthwise of a passageway defined by said wall, a retractable head, said passageway terminating in an open end defined by an end surface of said wall to receive the head in sealed seating relationship, means including a support mounted independently of the cylinder for supporting the head, means carried by the support for reciprocating the head along a path toward and away from a plane coinciding generally with said end surface, means connected to the support for moving an assembly comprising the support and the head along a fixed path extending in a transverse direction with respect to the longitudinal axis of the cylinder, said last-mentioned means being adapted to move said assembly into and out of a position which aligns the head for movement along said first-mentioned path into seating relation with said end surface, said cylinder having a pair of flanged portions extending along opposite sides of the open end of the wall of which their outer surfaces are rectilinear and parallel, and said support having a pair of spaced legs, each leg of the support having a rectilinear groove disposed for simultaneous complementary relation of both grooves with both flanged portions.

5. Apparatus for separating a liquid from a mixture of a liquid and a solid material comprising a cylinder having a lateral wall, a piston movable lengthwise of the passageway defined by the wall, a retractable head, said passageway terminating in an open end defined by an end surface of the wall to receive the head in sealed seating relationship, means including a support mounted independently of the cylinder for supporting the head, means carried by the support for reciprocating the head along a path extending toward and away from a plane coinciding generally with said end surface, means connected to the support for moving an assembly comprising the support and the head along a fixed path extending in a transverse direction with respect to the longitudinal axis of the cylinder, said last-mentioned means being adapted to move said assembly between a position which aligns the head for movement along said first-mentioned path into seating relation with said end surface and a position in which the assembly is offset with respect to the cylinder axis, said cylinder and the support having interlocking guide surfaces of which the longitudinal direction extends parallel to said path of the assembly, said guide surfaces being arranged and disposed to positively limit the movement of the assembly as a whole to said fixed path, and downwardly-extending liquid-conducting means mounted on the support with its lower end in registry with the open end of the press cylinder when the support occupies the offset position.

6. In combination with a liquid supply means having a delivery port, apparatus for separating a liquid from a mixture of a liquid and a solid material comprising a cylinder having a wall, a piston movable lengthwise of a passageway defined by said wall, a retractable head, said passageway terminating in an open end defined by an end surface of said wall to receive the head in sealed seating relationship, means including a support mounted independently of the cylinder for supporting the head, means carried by the support for reciprocating the head along a path extending toward and away from a plane coinciding generally with said end surface, means connected to the support for moving an assembly comprising the support and the head along a fixed path extending in a transverse direction with respect to the longitudinal axis of the cylinder, said last-mentioned means being adapted to move said assembly between a position which aligns the head for movement along said first-mentioned path into seating relation with said end surface and a position wherein the assembly is offset with respect to the cylinder axis, said cylinder and the support having interlocking guiding surfaces of which the longitudinal direction extends parallel to said path of the assembly, said guide surfaces being arranged and disposed to positively limit the movement of the assembly as a whole to said fixed path, and downwardly extending liquid-conducting means mounted on the support with its upper end in registry with the port of the liquid supply means and its upper end in registry with the open end of the press cylinder when the support occupies its offset position.

7. A combination as defined in claim 6 wherein the port of the liquid supply means faces downwardly, and the port, the axis of the cylinder, and the path of the head are approximately coaxial at the first-named position of the assembly, and the longitudinal axis of the fluid-conducting means is coaxial with the axis of the cylinder in said offset position of the assembly.

8. Apparatus for separating liquid from a mixture of a liquid and a solid material comprising a cylinder having a wall, a piston movable lengthwise of a passageway defined by said wall, a retractable head, said passageway terminating in an open end defined by an end surface of said wall to receive the head in sealed seating relationship, means including a support mounted independently of the cylinder for supporting the head, means carried by the support for reciprocating the head along a path extending toward and away from a plane coinciding generally with said end surface, and means connected to the support for moving an assembly comprising the support and the head along a fixed path extending in a transverse direction with respect to the longitudinal axis of the cylinder, said last-mentioned means being adapted to move said assembly into and out of a position which aligns the head for movement along said first-mentioned path into seating relation with said end surface, said cylinder having flange portions defined by oppositely facing parallel guide surfaces disposed adjacent said open end of the wall on opposite sides thereof, said support comprising a pair of spaced legs having opposing interior surfaces grooved to receive said flange portions of the cylinder therein, said means for moving said assembly comprising a pair of spaced fluid cylinders aligned parallel with the longitudinal direction of the guide surfaces, the piston of each cylinder being connected to the legs of the support.

9. Apparatus for separating liquid from a mixture of a liquid and a solid material comprising a cylinder having a wall, a piston movable lengthwise of a passageway defined by said wall, a retractable head, said passageway terminating in an open end defined by an end surface of said wall to receive the head in sealed seating relationship, means including a support mounted independently of the cylinder for supporting the head, means carried by the support for reciprocating the head along a path extending toward and away from a plane coinciding generally with said end surface, and means connected to the support for moving an assembly comprising the support and the head along a fixed path extending in a transverse direction with respect to the longitudinal axis of the cylinder, said last-mentioned means being adapted to move said assembly into and out of a position which aligns the head for movement along said first-mentioned path into seating relation with said end surface, the support and the cylinder having parallel rectilinear guiding portions parallel to said path of the assembly, said guiding portions extending transversely with respect to their length and the axis of the cylinder into substantially complementary reentrant and protruding relationship for guiding the assembly along said fixed path and for holding the support in fixed relationship with the cylinder when the head is urged against said end surface.

References Cited in the file of this patent

UNITED STATES PATENTS

| 924,223 | Crow | June 8, 1909 |
| 1,003,987 | Cotton et al. | Sept. 26, 1911 |
| 1,004,214 | Steblin | Sept. 26, 1911 |
| 1,435,232 | Hieber | Nov. 14, 1922 |
| 1,631,037 | Kochenderfer | May 31, 1927 |
| 2,331,126 | Loomis | Oct. 5, 1943 |
| 2,422,895 | Habenicht | June 24, 1947 |

FOREIGN PATENTS

| 5,976 | Australia | Feb. 23, 1932 |